(12) United States Patent
Yang et al.

(10) Patent No.: US 10,778,098 B2
(45) Date of Patent: Sep. 15, 2020

(54) POWER SUPPLY SYSTEM, A SWITCHED TANK CONVERTER, AND METHODS THEREOF

(71) Applicant: Wiwynn Corporation, New Taipei (TW)

(72) Inventors: Cheng Chung Yang, New Taipei (TW); Po-Chia Huang, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 0 days.

(21) Appl. No.: 16/369,110

(22) Filed: Mar. 29, 2019

(65) Prior Publication Data
US 2020/0204072 A1 Jun. 25, 2020

(30) Foreign Application Priority Data

Dec. 22, 2018 (TW) .............................. 107146600 A

(51) Int. Cl.
*H02M 3/158* (2006.01)
(52) U.S. Cl.
CPC .................................. *H02M 3/158* (2013.01)
(58) Field of Classification Search
CPC ............ H02M 3/00; H02M 3/02; H02M 3/04; H02M 3/06; H02M 3/07; H02M 3/073; H02M 3/10; H02M 3/145; H02M 3/155; H02M 3/156; H02M 3/157; H02M 3/158; H02M 3/1584; H02M 3/1588; H02M 3/22; H02M 3/24; H02M 3/28; H02M 3/285;
(Continued)

(56) References Cited

U.S. PATENT DOCUMENTS 9,917,517 B1 3/2018 Jiang et al.
9,954,447 B2 4/2018 Yen et al.
(Continued)

FOREIGN PATENT DOCUMENTS

CN 103312143 A * 9/2013
CN 103312143 A 9/2013
(Continued)

OTHER PUBLICATIONS

M. Shoyama et al., "Resonant Switched Capacitor Converter with High Efficiency", IEEE, 2004, pp. 3780-3786. (Year: 2004).*
(Continued)

*Primary Examiner* — Thienvu V Tran
*Assistant Examiner* — Carlos O Rivera-Perez
(74) *Attorney, Agent, or Firm* — McClure, Qualey & Rodack, LLP

(57) ABSTRACT

A power supply system, which has a switched-tank converter with an adjustable conversion ratio, includes a first-stage power converter, a second-stage power converter, and a controller. The first-stage power converter converts a supply voltage to a first output voltage, and modulates the first output voltage according to a modulation signal. A second-stage power converter converts the first output voltage to a second output voltage, and generates a power signal according to the output power of the second output voltage. The controller determines, according to the power signal, whether the output power exceeds a threshold to generate the modulation signal.

19 Claims, 5 Drawing Sheets

(58) Field of Classification Search
CPC .. H02M 3/325; H02M 3/335; H02M 3/33507; H02M 3/33523; H02M 3/33538; H02M 3/33546; H02M 3/33553; H02M 2003/071; H02M 2003/072; H02M 2003/075; H02M 2003/077; H02M 2003/1555; H02M 2003/1566; H02M 2001/0016; H02M 2001/0019; H02M 2001/0022; H02M 2001/0025; H02M 2001/0045; H02M 2001/0064; H02M 2001/0067; H02M 2001/007; H02M 2001/008; H02M 2001/009; H02M 2001/0058; H02M 1/4241; H02M 2007/4815; H02M 2007/4818; Y02B 70/10; Y02B 70/14; Y02B 70/1458; Y02B 70/1466; Y02B 70/1475; Y02B 70/1491; Y02B 70/1425; Y02B 70/1433; Y02B 70/1416
USPC ........ 323/205–211, 222–226, 266, 270–275, 323/282–287, 299, 351; 363/15–21.04, 363/21.12, 37, 40–43, 65, 71, 74, 79, 89, 363/95–99, 123, 124, 131–134
See application file for complete search history.

(56) References Cited

U.S. PATENT DOCUMENTS

| | | |
|---|---|---|
| 10,122,256 B1 | 11/2018 | Babazadeh et al. |
| 10,224,803 B1* | 3/2019 | Rainer ................ H02M 1/083 |
| 2008/0294916 A1* | 11/2008 | Moussaoui ............... G06F 1/26 |
| | | 713/300 |
| 2012/0297104 A1 | 11/2012 | Thottuvelil et al. |
| 2017/0310227 A1 | 10/2017 | Zhang et al. |

FOREIGN PATENT DOCUMENTS

| | | |
|---|---|---|
| TW | I590574 B | 7/2017 |
| TW | I601367 B | 10/2017 |

OTHER PUBLICATIONS

English translation of CN 103312143. (Year: 2013).*
TIPO Office Action dated Aug. 1, 2019, Taiwan Application No. 107146600, pp. 1-8.
European Search Report dated Nov. 8, 2019, issued in application No. EP 19172830.2.

* cited by examiner

POWER SUPPLY SYSTEM, A SWITCHED TANK CONVERTER, AND METHODS THEREOF

CROSS REFERENCE TO RELATED APPLICATIONS

This Application claims priority of Taiwan Patent Application No. 107146600, filed on Dec. 22, 2018, the entirety of which is incorporated by reference herein.

BACKGROUND OF THE INVENTION

Field of the Invention

The disclosure relates generally to a power supply system having a switched-tank converter, and more particularly it relates to a power supply system having a switched-tank converter with an adjustable conversion ratio.

Description of the Related Art

Since the functions of mobile devices are becoming more and more complicated, their power consumption is increasing accordingly. Due to this increase in power consumption, the industry has begun to raise the voltages on buses for reducing line loss due to transmitted current. However, the operation voltage of a device in a system remains unchanged, meaning that a power supply system with a two-stage power converter is required to keep extant devices in a system functional.

Since power supply systems now use the architecture of a two-stage power converter so that the power supply system can provide the highest power-conversion efficiency, the power-conversion efficiency of the power supply system with a two-stage power converter should be optimized to achieve the goal of energy efficiency and high power-conversion efficiency.

BRIEF SUMMARY OF THE INVENTION

An embodiment of a power supply system is provided herein, which includes a first-stage power converter, a second-stage power converter, and a controller. The first-stage power converter converts a supply voltage into a first output voltage and modulates the first output voltage according to a modulation signal. The second-stage power converter converts the first output voltage into a second output voltage and generates a power signal according to output power of the second output voltage. The controller determines, according to the power signal, whether the output power exceeds a threshold to generate the modulation signal.

An embodiment of a power supply method is further provided herein, which includes: by using a first-stage power converter, converting a supply voltage into a first output voltage; converting the first output voltage into a second output voltage; determining whether output power of the second output voltage exceeds a threshold; and modulating the first output voltage in response to the output power exceeding the threshold.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
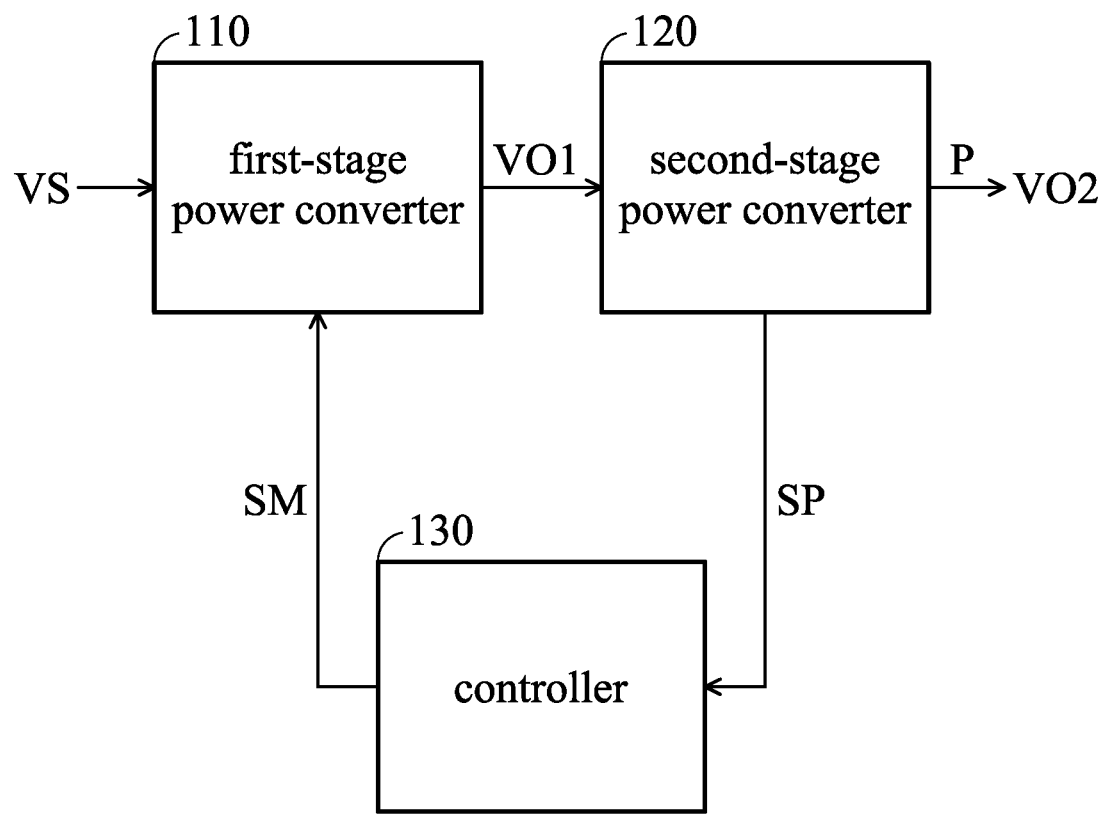
FIG. 1 is a block diagram of a power supply system in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a power supply system in accordance with an embodiment of the invention. As shown in FIG. 1, the power supply system 100 includes a first-stage power converter 110, a second-stage power converter 120, and a controller 130, in which the power supply system 100 is configured to convert the supply voltage VS into a second output voltage VO2.

According to other embodiments of the invention, the power supply system 100 may include a plurality of the second-stage power converters 120 which individually generate the different second-stage output voltages VO2 for satisfying the requirement of several different supply voltages for different devices. One second-stage power converter 120 is illustrated herein, but not intended to be limited thereto.

According to an embodiment of the invention, the first-stage power converter 110 converts the supply voltage VS into the first output voltage VO1, and the second-stage power converter 120 converts the first output voltage VO1 generated by the first-stage power converter 110 into the second output voltage VO2. The second-stage power converter 120 further detects the output power P of the second output voltage VO2 to generate the power signal SP, and provides the power signal SP to the controller 130.

The controller 130 determines, according to the power signal SP generated by the second-stage power converter 120, whether the output power P exceeds the threshold to generate the modulation signal SM. Therefore, the first-stage power converter 110 modulates the first output voltage VO1 according to the modulation signal SM for improving the power-conversion efficiency of the power supply system 100. According to some embodiments of the invention, the serial numbers of the integrated circuits for the second-stage power converter 120 detecting the output power P are: XDPE12284, XDPE12254, TPS53688, SN1701022, ISL69259, ISL69225, and etc.

According to an embodiment of the invention, the controller 130 may be a power management IC. According to another embodiment of the invention, the controller 130 may be a customized PWM controller. According to yet another embodiment of the invention, the controller 130 may be a DSP controller. According to other embodiments of the invention, the controller 130 may be a device in the power supply system 100 that controls any one of the first-stage power converter 110 and the second-stage power converter 120.

According to another embodiment of the invention, when the power supply system 100 includes a plurality of the second-stage power converters 120, the controller 130 calculates, according to the power signal SP generated by the plurality of the second-stage power converters 120, the sum of the output power P of all the second-stage power converters 120, and determines whether the sum of the output power P exceeds the threshold to generate the modulation signal SM. According to other embodiments of the invention, the controller 130 may monitor the output power of the supply voltage VS or of the first output voltage VO1, by any known or unknown way, to determine whether the output power exceeds the threshold.

According to yet another embodiment of the invention, the first-stage power converter 110 may detect the output power of the first output voltage VO1 to provide the power signal SP to the controller 130 (not shown in FIG. 1). According to yet another embodiment of the invention, the first-stage power converter 110 may also detect the input power of the supply voltage VS to provide the power signal SP to the controller 130 (not shown in FIG. 1).

For example, the controller 130 may detect, according to the battery fuel gauge of the battery, the power of the supply voltage VS to generate the modulation signal SM. Or, the first-stage power converter 110 may self-detect the output power of the first output voltage VO1 to generate a power signal, and the controller 130 generates the modulation signal SM according to the power signal generated by the first-stage power converter 110.

According to an embodiment of the invention, when the controller 130 determines that the output power P of the second output voltage VO2 exceeds the threshold, the first-stage power converter 110 raises the voltage value of the first output voltage VO1 according to the modulation signal SM. According to another embodiment of the invention, when the controller 130 determines that the output power P of the second output voltage VO2 does not exceed the threshold, the first-stage power converter 110 lowers the voltage value of the first output voltage VO1.

According to an embodiment of the invention, the first-stage power converter 110 is a switched tank converter and has a conversion ratio. When the output power P exceeds the threshold, the first-stage power converter 110 lowers the conversion ratio according to the modulation signal SM, in order to increase the voltage value of the first output voltage VO1. When the output power P does not exceed the threshold, the first-stage power converter 110 increases the conversion ratio according to the modulation signal SM, in order to lower the voltage value of the first output voltage VO1.

According to another embodiment of the invention, the first-stage power converter 110 is a power converter, such as an isolated half-/full-bridge, which has a duty cycle. When the output power P exceeds the threshold, the first-stage power converter 110 increases its duty cycle according to the modulation signal SM, in order to increase the voltage value of the first output voltage VO1. When the output power P does not exceed the threshold, the first-stage power converter lowers the duty cycle according to the modulation signal SM, in order to lower the voltage value of the first output voltage VO1.

According to an embodiment of the invention, the second-stage power converter 120 is a multi-phase voltage regulator which is able to self-detect the output power P. According to some embodiments of the invention, the serial numbers of the switching down-converter having the function of self-detecting the output power include: XDPE12284, XDPE12254, TPS53688, SN1701022, ISL69259, and ISL69225.

Figure 2:
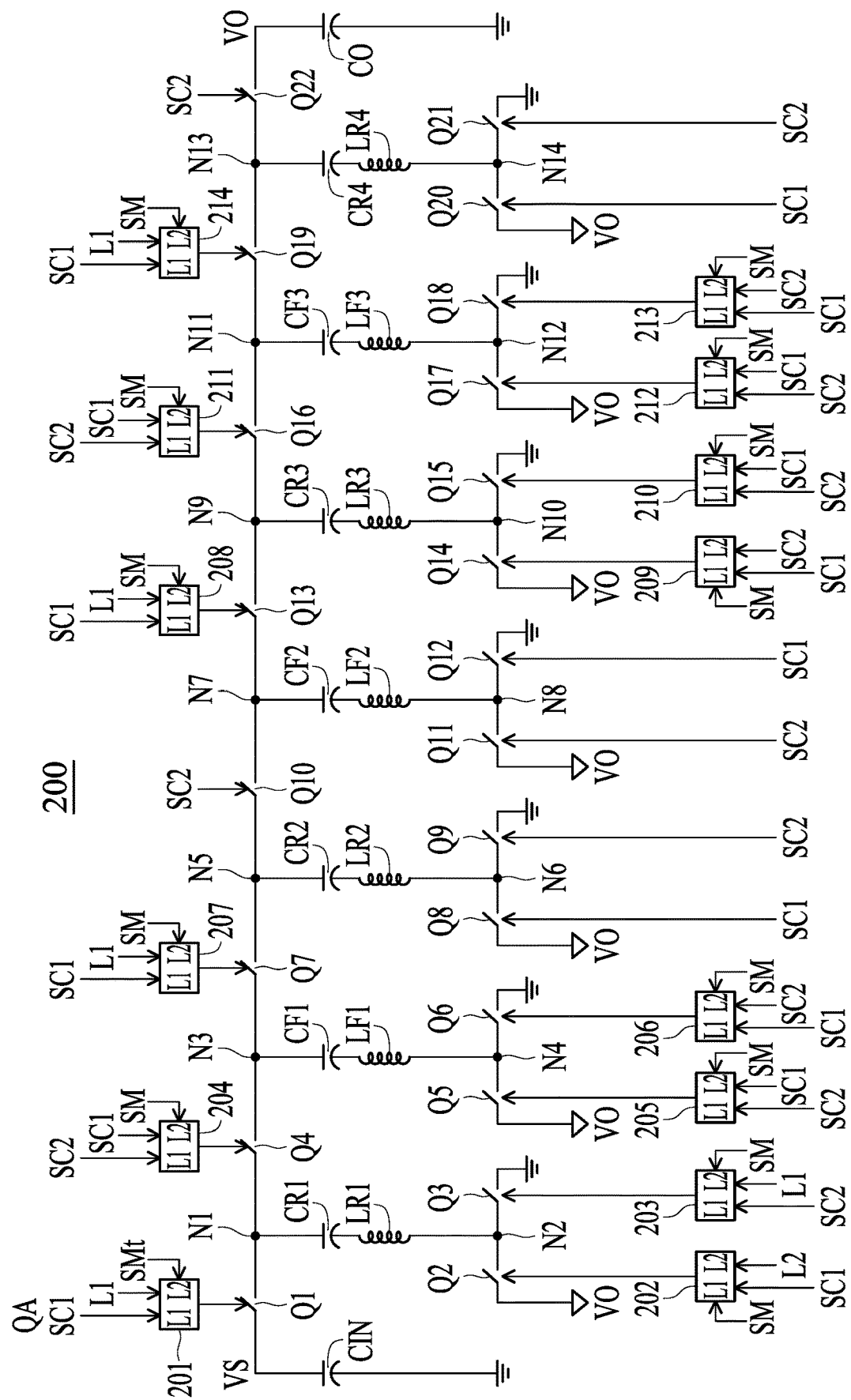
FIG. 2 is a schematic diagram of a switched-tank converter in accordance with an embodiment of the invention.

FIG. 2 is a schematic diagram of a switched-tank converter in accordance with an embodiment of the invention. As shown in FIG. 2, the conversion ratio of the switched tank converter 200 is illustrated to be switched from 8 to 4 herein, but not intended to be limited thereto.

As shown in FIG. 2, the switched tank converter 200 includes an input capacitor CIN, a first switch Q1, a first resonant capacitor CR1, a first resonant inductor LR1, a second switch Q2, a third switch Q3, a fourth switch Q4, a first fly capacitor CF1, a fifth switch Q5, a sixth switch Q6, a seventh switch Q7, a second resonant capacitor CR2, a second resonant inductor LR2, an eight switch Q8, a ninth switch Q9, a tenth switch Q10, a second fly capacitor CF2, an eleventh switch Q11, a twelfth switch Q12, a thirteenth switch Q13, a third resonant capacitor CR3, a third resonant inductor LR3, a fourteenth switch Q14, a fifteenth switch Q15, a sixteenth switch Q16, a third fly capacitor CF3, a seventeenth switch Q17, an eighteenth switch Q18, a nineteenth switch Q19, a fourth resonant capacitor CR4, a fourth resonant inductor LR4, a twentieth switch Q20, a twenty-first switch Q21, a twenty-second switch Q22, and an output capacitor CO.

The input capacitor CIN is coupled between the supply voltage VS and the ground. The first switch Q1 supplies the supply voltage VS to the first node N1 according to the first control signal SC1 and the modulation signal SM. The first resonant capacitor CR1 is coupled to the first node N1, and the first resonant inductor LR1 is coupled between the first resonant capacitor CR1 and the second node N2. The first resonant inductor LR1 is configured to resonate with the first resonant capacitor to provide the output current. According to an embodiment of the invention, the first resonant inductor LR1 is the parasitic inductance of the first resonant capacitor CR1. According to another embodiment, the first resonant inductor LR1 may be an external inductance element, or a combination of an external inductance element and the parasitic inductor of the first resonant capacitor CR1.

The second switch Q2 coupled the second node N2 to the output voltage VO according to the first control signal SC1 and the modulation signal SM. The third switch Q3 couples the second node N2 to the ground according to the second control signal SC2 and the modulation signal SM. The fourth switch Q4 couples the first node N1 to the third node N3 according to the first control signal SC1, the second control signal SC2, and the modulation signal SM. The first fly capacitor CF1 is coupled between the third node N3 and the fourth node N4.

According to another embodiment of the invention, the switched tank converter 200 further includes a first fly inductor LF1 coupled between the first fly capacitor CF1 and the fourth node N4. The first fly inductor LF1 is configured to increase the converting efficiency of the switched tank converter 200. According to some embodiments of the invention, the first fly inductor LF1 may be the parasitic inductor of the first fly capacitor CF1, another external inductance element, or a combination thereof.

The fifth switch Q5 couples the fourth node N4 to the output voltage VO according to the first control signal SC1, the second control signal SC2, and the modulation signal SM. The sixth switch Q6 couples the fourth node N4 to the ground according to the first control signal SC1, the second control signal SC2, and the modulation signal SM. The seventh switch Q7 couples the third node N3 to the fifth node N5 according to the first control signal SC1 and the modulation signal SM.

The second resonant capacitor CR2 is couple to the fifth node N5, and the second resonant inductor LR2 is coupled between the second resonant capacitor CR2 and the sixth node N6. According to an embodiment of the invention, the second resonant inductor LR2 is the parasitic inductor of the second resonant capacitor CR2. According to another embodiment of the invention, the second resonant inductor LR2 may be an external inductance element, or a combination of an external inductance element and the parasitic inductor of the second resonant capacitor CR2.

The eighth switch Q8 couples the sixth node N6 to the output voltage VO according to the first control signal SC1. The ninth switch Q9 couples the sixth node N6 to the ground according to the second control signal SC2. The tenth switch Q10 couples the fifth node N5 to the seventh node N7 according to the second control signal SC2.

The second fly capacitor CF2 is coupled between the seventh node N7 and the eighth node N8. The eleventh switch Q11 couples the eighth node N8 to the output voltage VO according to the second control signal SC2. The twelfth switch Q12 couples the eighth node N8 to the ground according to the first control signal SC1. The thirteenth switch Q13 couples the seventh node N7 to the ninth node N9 according to the first control signal SC1 and the modulation signal SM.

According to another embodiment of the invention, the switched tank converter 200 further includes the second fly inductor LF2 coupled between the second fly capacitor CF2 and the eighth node N8, in which the second fly inductor LF2 is configured to increase the conversion ratio of the switched tank converter 200. According to some embodiments of the invention, the second fly inductor LF2 may be the parasitic inductor of the second fly capacitor CF2, another external inductance element, or a combination thereof.

The third resonant capacitor CR3 is coupled to the ninth node N9, and the third resonant inductor LR3 is coupled between the third resonant capacitor CR3 and the tenth node N10. According to an embodiment of the invention, the third resonant inductor LR3 is the parasitic inductor of the third resonant capacitor CR3. According to another embodiment of the invention, the third resonant inductor LR3 may be an external inductance element, or a combination of the external inductance element and the parasitic inductor of the third resonant capacitor CR3.

The fourteenth switch Q14 couples the tenth node N10 to the output voltage VO according to the first control signal SC1, the second control signal SC2, and the modulation signal SM. The fifteenth switch Q15 couples the tenth node N10 to the ground according to the first control signal SC1, the second control signal SC2, and the modulation signal SM. The sixteenth switch Q16 couples the ninth node N9 to the eleventh node N11 according to the first control signal SC1, the second control signal SC2, and the modulation signal SM.

The third fly capacitor CF3 is coupled between the eleventh node N11 and the twelfth node N12. The seventeenth switch Q17 couples the twelfth node N12 to the output voltage VO according to the first control signal SC1, the second control signal SC2, and the modulation signal SM. The eighteenth switch Q18 couples the twelfth node N12 to the ground according to the first control signal SC1, the second control signal SC2, and the modulation signal SM. The nineteenth switch Q19 couples the eleventh node N11 to the thirteenth node N13 according to the first control signal SC1 and the modulation signal SM.

According to another embodiment of the invention, the switched tank converter 200 further includes a third fly inductor LF3 coupled between the third fly capacitor CF3 and the twelfth node N12, in which the third fly inductor LF3 is configured to increase the conversion ratio of the switched tank converter 200. According to some embodiments of the invention, the third fly inductor LF3 may be the parasitic inductor of the third fly capacitor CF3, another external inductance element, or a combination thereof.

The fourth resonant capacitor CR4 is coupled to the thirteenth node N13, and the fourth resonant inductor LR14 is coupled between the fourth resonant capacitor CR4 and the fourteenth node N14. According to an embodiment of the invention, the fourth resonant inductor LR4 is the parasitic inductor of the fourth resonant capacitor CR4. According to another embodiment of the invention, the fourth resonant inductor LR4 may be an external inductance element, or a combination of the external inductance element and the parasitic inductor of the fourth resonant capacitor CR4.

The twentieth switch Q20 couples the fourteenth node N14 to the output voltage VO according to the first control signal SC1. The twenty-first switch Q21 couples the fourteenth node N14 to the ground according to the second control signal SC2. The twenty-second switch Q22 couples the thirteenth node N13 to the output voltage VO according to the second control signal SC2. The output capacitor CO is coupled between the output voltage VO and the ground.

According to an embodiment of the invention, the output voltage VO in FIG. 2 corresponds to the first output voltage VO1 in FIG. 1, and the supply voltage VS in FIG. 2 corresponds to the supply voltage VS in FIG. 1. According to an embodiment of the invention, the duty cycles of the first control signal SC1 and the second control signal SC2 are both 50% and out-of-phase.

According to an embodiment of the invention, the controller 130 in FIG. 1 is configured to generate the first control signal SC1 and the second control signal SC2. According to other embodiments of the invention, the switched tank converter 200 further includes a controller (not shown in FIG. 2), which is configured to generate the first control signal SC1 and the second control signal SC2. For the simplicity of explanation, the way of generating the first control signal SC1 and the second control signal SC2 is omitted. According to an embodiment of the invention, the modulation signal SM corresponds to the modulation signal SM generated by the controller 130 in FIG. 1.

The switched tank converter 200 further includes a first selector 201, a second selector 202, a third selector 203, a fourth selector 204, a fifth selector 205, a sixth selector 206, a seventh selector 207, an eighth selector 208, a ninth selector 209, a tenth selector 210, an eleventh selector 211, a twelfth selector 212, a thirteenth selector 213, and a fourteenth selector 214, which are configured to select the first control signal SC1 or the second control signal SC2 according to the modulation signal SM.

According to an embodiment of the invention, when the modulation signal SM is in the first logic level L1, the first selector 201, the second selector 202, the sixth selector 206, the seventh selector 207, the eighth selector 208, the ninth selector 209, the thirteenth selector 213, and the fourteenth selector 214 select the first control signal SC1 to respectively turn the first switch Q1, the second switch Q2, the sixth switch Q6, the seventh switch Q7, the thirteenth switch Q13, the fourteenth switch Q14, the eighteenth switch Q18, and the nineteenth switch Q19 ON and OFF.

Meanwhile, the third selector 203, the fourth selector 204, the fifth selector 205, the tenth selector 210, the eleventh selector 211, and the twelfth selector 212 select the second control signal SC2 to respectively turn the third switch Q3, the fourth switch Q4, the fifth switch Q5, the fifteenth switch Q15, the sixteenth switch Q16, and the seventeenth switch Q17 ON and OFF.

In other words, when the modulation signal SM is in the first logic level L1, the first switch Q1, the second switch Q2, the sixth switch Q6, the seventh switch Q7, the eighth switch Q8, the twelfth switch Q12, the thirteenth switch Q13, the fourteenth switch Q14, the eighteenth switch Q18, the nineteenth switch Q19, and the twentieth switch Q20 are turned ON and OFF according to the first control signal SC1. The third switch Q3, the fourth switch Q4, the fifth switch Q5, the ninth switch Q9, the tenth switch Q10, the eleventh switch Q11, the fifteenth switch Q15, the sixteenth switch Q16, the seventeenth switch Q17, the twenty-first switch Q21, and the twenty-second switch Q22 are turned ON and OFF according to the second control signal SC2.

When the first switch Q1 and the second switch Q2 are turned ON according to the first control signal SC1, the supply voltage VS and the output voltage VO are respectively applied to both terminals of the first resonant capacitor CR1 to charge the first resonant capacitor CR1 such that the voltage across the first resonant capacitor CR1 is (VS−VO). When the third switch Q3, the fourth switch Q4, and the fifth switch Q5 are turned ON according to the second control signal SC2, the voltage of the first node N1 and the output voltage VO are respectively applied to both terminals of the first fly capacitor CF1 to charge the first fly capacitor CF1 such that the voltage across the first fly capacitor CF1 is (VS−2*VO).

Similarly, the voltage across the fourth resonant capacitor CR4 is (VS−7*VO). When the fourth resonant capacitor CR4 charges the output capacitor CO, it indicates that the voltage across the fourth resonant capacitor CR4 is equal to the output voltage VO. That is, the supply voltage VS is 8-fold of the output voltage VO. In other words, when the modulation signal SM is in the first logic level L1, the conversion ratio of the switched tank converter 200 is 8. Namely, the output voltage VO of the switched tank converter 200 is the ratio of the supply voltage VS to the conversion ratio.

According to another embodiment of the invention, when the modulation signal SM is in the second logic level L2, the first selector 201, the third selector 203, the seventh selector 207, the eighth selector 208, and the fourteenth selector 214 select the first logic level L1 such that the first switch Q1, the third switch Q3, the seventh switch Q7, the thirteenth switch Q13, and the nineteenth switch Q19 are always ON. The second selector 202 selects the second logic level L2 to keep the second switch Q2 be always OFF.

In addition, since the modulation signal SM is in the second logic level L2, the sixth selector 206, the ninth selector 209, and the thirteenth selector 213 select the second signal SC2 to respectively turn the sixth switch Q6, the fourteenth switch Q14, and the eighteenth switch Q18 ON and OFF. The fourth selector 204, the fifth selector 205, the tenth selector 210, the eleventh selector 211, and the twelfth selector 212 select the first control signal SC1 to respectively turn the fourth switch Q4, the fifth switch Q5, the fifteenth switch Q15, the sixteenth switch Q16, and the seventeenth switch Q17 ON and OFF.

In other words, when the modulation signal SM is in the second logic level L2, the sixth switch Q6, the ninth switch Q9, the tenth switch Q10, the eleventh switch Q11, the fourteenth switch Q14, the eighteenth switch Q18, the twenty-first switch Q21, and the twenty-second switch Q22 are turned ON and OFF according to the second control signal SC2. The fourth switch Q4, the fifth switch Q5, the eighth switch Q8, the twelfth switch Q12, the fifteenth switch Q15, the sixteenth switch Q16, the seventeenth switch Q17, and the twentieth switch Q20 are turned ON and OFF according to the first control signal SC1. The first switch Q1, the third switch Q3, the seventh switch Q7, the thirteenth switch Q13, the nineteenth switch Q19 are always ON, and the second switch Q2 are always OFF.

Figure 3:
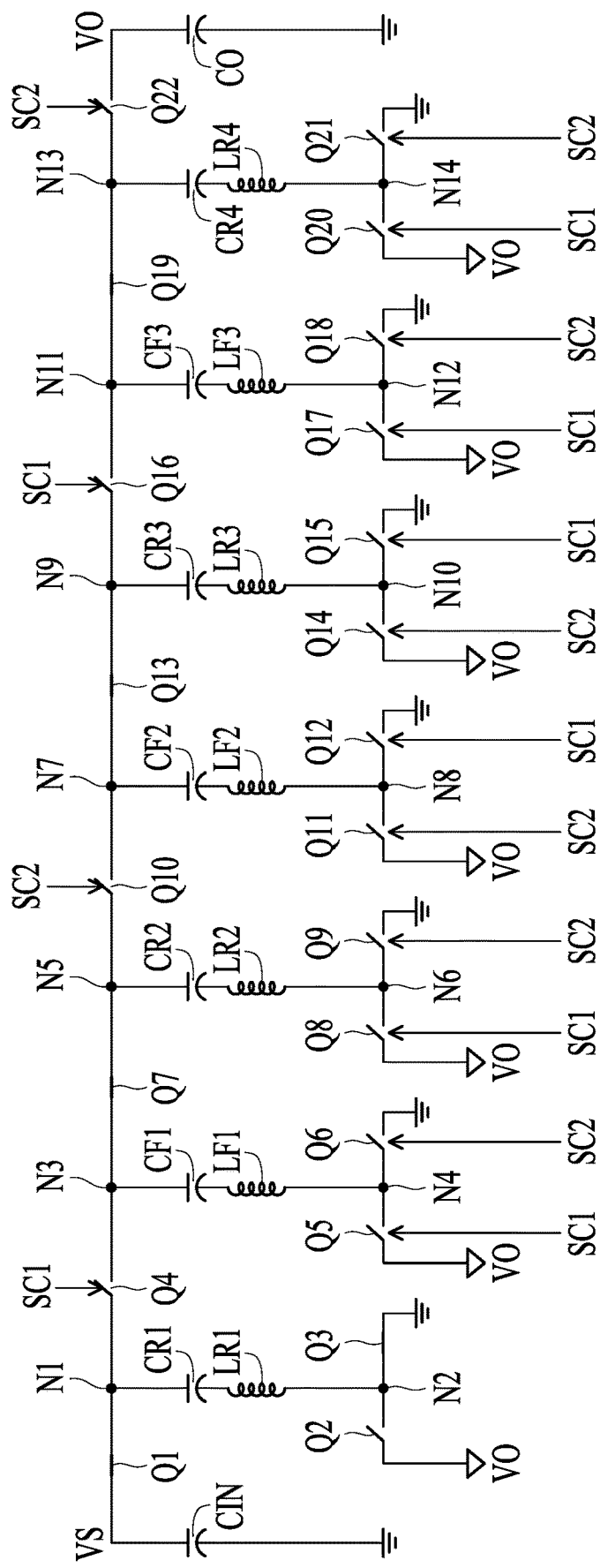
FIG. 3 is a schematic diagram of a switched-tank converter in accordance with another embodiment of the invention.

FIG. 3 is a schematic diagram of a switched-tank converter in accordance with another embodiment of the invention. As shown in FIG. 3, the switched tank converter 300 is simplified from the switched tank converter 200 in FIG. 2 during the modulation signal SM being in the second logic level L2.

As shown in FIG. 3, when the modulation signal SM is in the second logic level L2, the first switch Q1, the third switch Q3, the seventh switch Q7, the thirteenth switch Q13, and the nineteenth switch Q19 are always ON, and the second switch Q2 is always OFF.

The fourth switch Q4, the fifth switch Q5, the eighth switch Q8, the twelfth switch Q12, the fifteenth switch Q15, the sixteenth switch Q16, the seventeenth switch Q17, and the twelfth switch Q20 are turned ON and OFF according to the first control signal SC1. In addition, the sixth switch Q6, the ninth switch Q9, the tenth switch Q10, the eleventh switch Q11, the fourteenth switch Q14, the eighteenth switch Q18, the twenty-first switch Q21, and the twenty-second switch Q22 are turned ON and OFF according to the second control signal SC2.

In other words, as shown in FIG. 3, the input capacitor CIN and the first resonant capacitor CR1 can be viewed as a capacitor, the first fly capacitor CF1 and the second resonant capacitor CR2 can be viewed as a capacitor, the second fly capacitor CF2 and the third resonant capacitor CR3 can be viewed as a capacitor, and the third fly capacitor CF3 and the fourth resonant capacitor CR4 can be viewed as a capacitor. According to an embodiment of the invention, each of the switches Q1~Q22 is a transistor, such as Metal-Oxide-Semiconductor Field-Effect Transistor (MOSFET), bipolar junction transistor (BJT), and other electrical elements which can be acted as a switch.

As derived above, the supply voltage VS can be 4-fold of the output voltage VO. Namely, when the modulation signal SM is in the second logic level L2, the conversion ratio of the switched tank converter 200 (i.e., the switched tank converter 300) is 4.

When the supply voltage VS is fixed and the conversion ratio of the switched tank converter 200 is changed, the output voltage VO should be increased or decreased to modulate the first output voltage VO1 in FIG. 1 such that the power supply system could have the highest conversion ratio.

Figure 4:
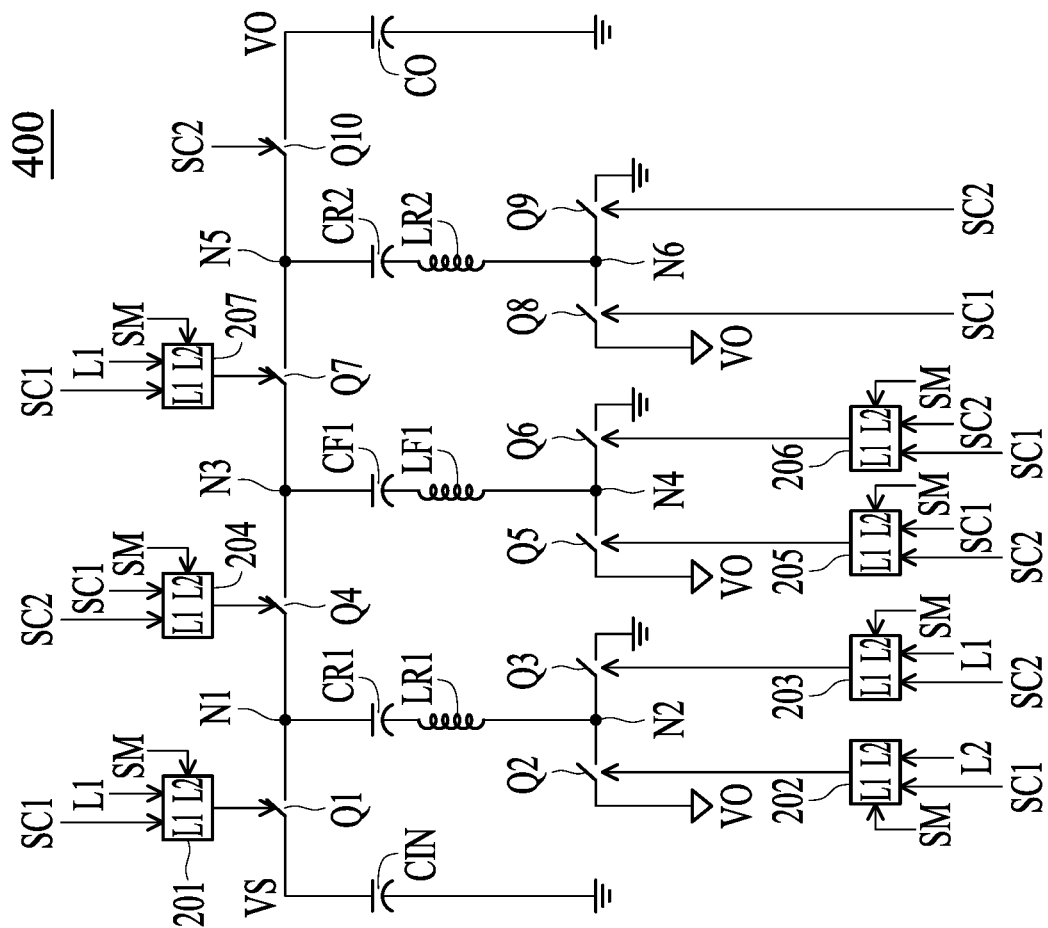
FIG. 4 is a schematic diagram of a switched-tank converter in accordance with another embodiment of the invention.

FIG. 4 is a schematic diagram of a switched-tank converter in accordance with another embodiment of the invention. The operation of the switched tank converter 400 in FIG. 4 is identical to that of the switched tank converter 200 in FIG. 2, which is not repeated herein.

As shown in FIG. 4, when the modulation signal SM is in the first logic level L1, the conversion ratio of the switched tank converter 400 is 4. When the modulation signal SM is in the second logic level L2, the first switch Q1, the third switch Q3, and the seventh switch Q7 are always ON, and the second switch Q2 is always OFF. Therefore, the conversion ratio of the switched tank converter 400 is changed from 4 to 2.

A switched tank converter with a conversion ratio changing from 8 to 4 and a switched tank converter with a conversion ratio changing from 4 to 2 are provided herein. One skilled in the art may associate with other switch tank converters with a changing conversion ratio according to the teaching of the invention.

Figure 5:
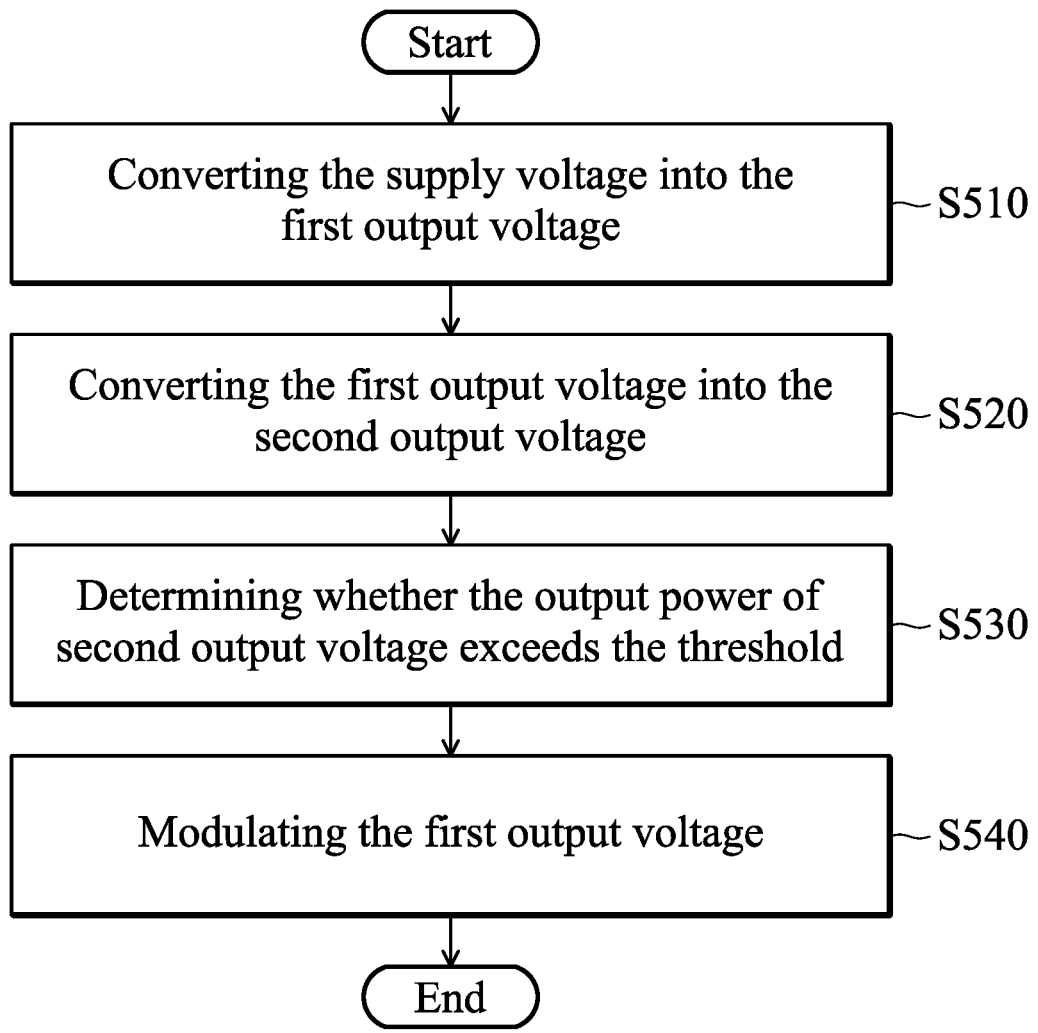
FIG. 5 is a flow chart of a power supply method in accordance with an embodiment of the invention.

FIG. 5 is a flow chart of a power supply method in accordance with an embodiment of the invention. The description of the power supply method 500 will be fully explained with the power supply system 100 in FIG. 1.

First, the supply voltage VS is converted into the first output voltage VO1 by the first-stage power converter 110 (Step S510). The first output voltage VO1 is converted into the second output voltage VO2 by the second-stage power converter 120 (Step S520). It is determined that whether the output power of second output voltage VO2 exceeds the threshold (Step S530).

According to another embodiment of the invention, when the power supply system 100 includes a plurality of the second-stage power converters 120, the controller 130 calculates, according to the power signals SP generated by the plurality of the second-stage power converters 120, the sum of the output power P of all the second-stage power converter 120, and determines whether the sum of the output power P exceeds the threshold to generate the modulation signal SM. According to other embodiments of the invention, the controller 130 may monitor the input power of the supply voltage VS or the output power of the first output voltage VO1, by any known or unknown ways, to determine whether the output power exceeds the threshold.

According to another embodiment of the invention, the first-stage power converter 110 may detect the output power of the first output voltage VO1 to provide the power signal SP to the controller 130 (not shown in FIG. 1). According to another embodiment of the invention, the first-stage power converter 110 may also detect the input power of the supply voltage VS to provide the power signal SP to the controller 130 (not shown in FIG. 1).

The first output voltage VO1 is modulated according to whether the output power P of the second output voltage VO2 exceeds the threshold (Step S540). According to an embodiment of the invention, the first-stage power converter 110 is a switched tank converter, and the first output voltage VO1 can be modulated by changing the conversion ratio of the switched tank converter. According to an embodiment of the invention, the switched tank converter 200 in FIG. 2 is illustrated as the conversion ratio changing from 8 to 4 to explain how the switched tank converter modulates the output voltage.

According to another embodiment of the invention, the first-stage power converter 110 is a power converter, such as an isolated half-/full-bridge converter. Therefore, the first output voltage VO1 can be modulated by adjusting the duty cycle of the power converter. According to other embodiments of the invention, the first-stage power converter 110 is a down-converter. The illustration as above is merely for explanation, but not intended to be limited thereto. Referring to Step S540, when it is determined that the output power of the second output voltage VO2 does not exceed the threshold, Step S510 is returned.

Embodiments of a power supply system, a switched tank converter, and a power supply method are provided herein. The overall conversion ratio of the power supply system can be improved by modulating the output voltage of the first-stage power converter.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power supply system, comprising:
a first-stage power converter, converting a supply voltage into a first output voltage and modulating the first output voltage according to a modulation signal, wherein the first-stage power converter comprises:
an input capacitor, coupled between the supply voltage and a ground;
a first switch, providing the supply voltage to a first node according to a first control signal and the modulation signal;
a first resonant capacitor, coupled to the first node;
a first resonant inductor, coupled between the first resonant capacitor and a second node;
a second switch, coupling the second node to the first output voltage according to the first control signal and the modulation signal;
a third switch, coupling the second node to the ground according to a second control signal and the modulation signal;
a fourth switch, coupling the first node to a third node according to the first control signal, the second control signal, and the modulation signal;
a first fly capacitor, coupled between the third node and a fourth node;
a fifth switch, coupling the fourth node to the first output voltage according to the first control signal, the second control signal, and the modulation signal, wherein the fifth switch couples the fourth node to the first output voltage based on the state of the first control signal when the modulation signal is in a second logic level, and wherein the fifth switch couples the fourth node to the first output voltage based on the state of the second control signal when the modulation signal is in a first logic level; a sixth switch, coupling the fourth node to the ground according to the first control signal, the second control signal, and the modulation signal, wherein the sixth switch couples the fourth node to the ground based on the state of the second control signal when the modulation signal is in the second logic level, and wherein the sixth switch couples the fourth node to the ground based on the state of the first control signal when the modulation signal is in the first logic level; a seventh switch, coupling the third node to a fifth node according to the first control signal and the modulation signal; a second resonant capacitor, coupled to the fifth node; a second resonant inductor, coupled between the second resonant capacitor and a sixth node;

an eighth switch, coupling the sixth node to the first output voltage according to the first control signal;

a ninth switch, coupling the sixth node to the ground according to the second control signal;

a tenth switch, coupling the fifth node to a seventh node according to the second control signal, wherein the seventh node is coupled to the first output voltage; and an output capacitor, coupled between the first output voltage and the ground, wherein the first control signal and the second control signal are out-of-phase;

a second-stage power converter, converting the first output voltage into a second output voltage and detecting output power of the second output voltage to generate a power signal; and a controller, determining, according to the power signal, whether the output power exceeds a threshold to generate the modulation signal.

2. The power supply system of claim 1, wherein the first-stage power converter increases, according to the modulation signal, the first output voltage in response to the output power exceeding the threshold.

3. The power supply system of claim 2, wherein the first-stage power converter decreases, according to the modulation signal, the first output voltage in response to the output power not exceeding the threshold.

4. The power supply system of claim 3, wherein the first-stage power converter is a switched tank converter having a conversion ratio, wherein the first-stage power converter decreases the conversion ratio to increase the first output voltage in response to the output power exceeding the threshold, wherein the first-stage power converter increases the conversion ratio to decrease the first output voltage in response to the output power not exceeding the threshold.

5. The power supply system of claim 3, wherein the first-stage power converter is a power converter having a duty cycle, wherein in response to the output power exceeding the threshold, the first-stage power converter increases the duty cycle to increase the first output voltage, wherein in response to the output power not exceeding the threshold, the first-stage power converter decreases the duty cycle to decrease the first output voltage.

6. The power supply system of claim 1, wherein the first-stage power converter further comprises:

a second fly capacitor, coupled to the seventh node and an eighth node;

an eleventh switch, coupling the eighth node to the first output voltage according to the second control signal;

a twelfth switch, coupling the eighth node to the ground according to the first control signal;

a thirteenth switch, coupling the seventh node to a ninth node according to the first control signal and the modulation signal;

a third resonant capacitor, coupled to the ninth node;

a third resonant inductor, coupled between the third resonant capacitor and a tenth node;

a fourteenth switch, coupling the tenth node to the first output voltage according to the first control signal, the second control signal, and the modulation signal;

a fifteenth switch, coupling the tenth node to the ground according to the first control signal, the second control signal, and the modulation signal;

a sixteenth switch, coupling the ninth node to an eleventh node according to the first control signal, the second control signal, and the modulation signal;

a third fly capacitor, coupled between the eleventh node and a twelfth node;

a seventeenth switch, coupling the twelfth node to the first output voltage according to the first control signal, the second control signal, and the modulation signal;

an eighteenth switch, coupling the twelfth node to the ground according to the first control signal, the second control signal, and the modulation signal;

a nineteenth switch, coupling the eleventh node to a thirteenth node according to the first control signal, and the modulation signal;

a fourth resonant capacitor, coupled to the thirteenth node;

a fourth resonant inductor, coupled between the fourth resonant capacitor and the fourteenth node;

a twentieth switch, coupling the fourteenth node to the first output voltage according to the first control signal;

a twenty-first switch, coupling the fourteenth node to the ground according to the second control signal; and a twenty-second switch, coupling the thirteenth node to the first output voltage according to the second control signal.

7. The power supply system of claim 6, wherein in response to the modulation signal in the first logic level, the first switch, the second switch, the sixth switch, the seventh switch, the eighth switch, the twelfth switch, the thirteenth switch, the fourteenth switch, the eighteenth switch, the nineteenth switch, and the twentieth switch are turned ON and OFF according to the first control signal, and the third switch, the fourth switch, the fifth switch, the ninth switch, the tenth switch, the eleventh switch, the fifteenth switch, the sixteenth switch, the seventeenth switch, the twenty-first switch, and the twenty-second switch are turned ON and OFF according to the second control signal, wherein the switched tank converter has a first conversion ratio, and the first output voltage is a ratio of the supply voltage to the first conversion ratio.

8. The power supply system of claim 7, wherein in response to the modulation signal in the second logic level, the first switch, the third switch, the seventh switch, the thirteenth switch, and the nineteenth switch are always ON, the second switch is always OFF, the sixth switch, the ninth switch, the tenth switch, the eleventh switch, the fourteenth switch, the eighteenth switch, the twenty-first switch, and the twenty-second switch are turned ON and OFF according to the second control signal, and the fourth switch, the fifth switch, the eighth switch, the twelfth switch, the fifteenth switch, the sixteenth switch, the seventeenth switch, and the twentieth switch are turned ON and OFF according to the first control signal, wherein the switched tank converter has a second conversion ratio and the first output voltage is a ratio of the supply voltage to the second conversion ratio.

9. The power supply system of claim 8, wherein the second conversion ratio is less than the first conversion ratio.

10. The power supply voltage system of claim 6, wherein the first-stage power converter further comprises:

a first fly inductor, coupled between the first fly capacitor and the fourth node;

a second fly inductor, coupled between the second fly capacitor and the eighth node; and a third fly inductor, coupled between the third fly capacitor and the twelfth node, wherein the first fly inductor, the second fly inductor, and the third fly inductor are configured to improve power-conversion efficiency of the first-stage power converter.

11. A switched tank converter converting a supply voltage into an output voltage, comprising:
an input capacitor, coupled between the supply voltage and a ground;
a first switch, providing the supply voltage to a first node according to a first control signal and the modulation signal;
a first resonant capacitor, coupled to the first node;
a first resonant inductor, coupled between the first resonant capacitor and a second node;
a second switch, coupling the second node to a first output voltage according to the first control signal and the modulation signal;
a third switch, coupling the second node to the ground according to a second control signal and the modulation signal;
a fourth switch, coupling the first node to a third node according to the first control signal, the second control signal, and the modulation signal;
a first fly capacitor, coupled between the third node and a fourth node;
a fifth switch, coupling the fourth node to the first output voltage according to the first control signal, the second control signal, and the modulation signal, wherein the fifth switch couples the fourth node to the first output voltage based on the state of the first control signal when the modulation signal is in a second logic level, and wherein the fifth switch couples the fourth node to the first output voltage based on the state of the second control signal when the modulation signal is in a first logic level; a sixth switch, coupling the fourth node to the ground according to the first control signal, the second control signal, and the modulation signal, wherein the sixth switch couples the fourth node to the ground based on the state of the second control signal when the modulation signal is in the second logic level; and wherein the sixth switch couples the fourth node to the ground based on the state of the first control signal when the modulation signal is in the first logic level; a seventh switch, coupling the third node to a fifth node according to the first control signal and the modulation signal; a second resonant capacitor, coupled to the fifth node; a second resonant inductor, coupled between the second resonant capacitor and a sixth node;
an eighth switch, coupling the sixth node to the first output voltage according to the first control signal;
a ninth switch, coupling the sixth node to the ground according to the second control signal;
a tenth switch, coupling the fifth node to a seventh node according to the second control signal, wherein the seventh node is coupled to the first output voltage; and
an output capacitor, coupled between the first output voltage and the ground, wherein the first control signal and the second control signal are out-of-phase.

12. The switched tank converter of claim 11, further comprising:
a second fly capacitor, coupled to the seventh node and an eighth node;
an eleventh switch, coupling the eighth node to the first output voltage according to the second control signal;
a twelfth switch, coupling the eighth node to the ground according to the first control signal;

a thirteenth switch, coupling the seventh node to a ninth node according to the first control signal and the modulation signal;
a third resonant capacitor, coupled to the ninth node;
a third resonant inductor, coupled between the third resonant capacitor and a tenth node;
a fourteenth switch, coupling the tenth node to the first output voltage according to the first control signal, the second control signal, and the modulation signal;
a fifteenth switch, coupling the tenth node to the ground according to the first control signal, the second control signal, and the modulation signal;
a sixteenth switch, coupling the ninth node to an eleventh node according to the first control signal, the second control signal, and the modulation signal;
a third fly capacitor, coupled between the eleventh node and a twelfth node;
a seventeenth switch, coupling the twelfth node to the first output voltage according to the first control signal, the second control signal, and the modulation signal;
an eighteenth switch, coupling the twelfth node to the ground according to the first control signal, the second control signal, and the modulation signal;
a nineteenth switch, coupling the eleventh node to a thirteenth node according to the first control signal, and the modulation signal;
a fourth resonant capacitor, coupled to the thirteenth node;
a fourth resonant inductor, coupled between the fourth resonant capacitor and the fourteenth node;
a twentieth switch, coupling the fourteenth node to the first output voltage according to the first control signal;
a twenty-first switch, coupling the fourteenth node to the ground according to the second control signal; and
a twenty-second switch, coupling the thirteenth node to the first output voltage according to the second control signal.

13. The switched tank converter of claim 12, wherein in response to the modulation signal in the first logic level, the first switch, the second switch, the sixth switch, the seventh switch, the eighth switch, the twelfth switch, the thirteenth switch, the fourteenth switch, the eighteenth switch, the nineteenth switch, and the twentieth switch are turned ON and OFF according to the first control signal, and the third switch, the fourth switch, the fifth switch, the ninth switch, the tenth switch, the eleventh switch, the fifteenth switch, the sixteenth switch, the seventeenth switch, the twenty-first switch, and the twenty-second switch are turned ON and OFF according to the second control signal, wherein the switched tank converter has a first conversion ratio, and the first output voltage is a ratio of the supply voltage to the first conversion ratio.

14. The switched tank converter of claim 13, wherein in response to the modulation signal in the second logic level, the first switch, the third switch, the seventh switch, the thirteenth switch, and the nineteenth switch are always ON, the second switch is always OFF, the sixth switch, the ninth switch, the tenth switch, the eleventh switch, the fourteenth switch, the eighteenth switch, the twenty-first switch, and the twenty-second switch are turned ON and OFF according to the second control signal, and the fourth switch, the fifth switch, the eighth switch, the twelfth switch, the fifteenth switch, the sixteenth switch, the seventeenth switch, and the twentieth switch are turned ON and OFF according to the first control signal, wherein the switched tank converter has a second conversion ratio and the first output voltage is a ratio of the supply voltage to the second conversion ratio.

15. The switched tank converter of claim 14, wherein the second conversion ratio is less than the first conversion ratio.

16. The switched tank converter of claim 12, further comprising:
- a first fly inductor, coupled between the first fly capacitor and the fourth node;
- a second fly inductor, coupled between the second fly capacitor and the eighth node; and
- a third fly inductor, coupled between the third fly capacitor and the twelfth node, wherein the first fly inductor, the second fly inductor, and the third fly inductor are configured to improve power conversion efficiency of the first-stage power converter.

17. A power supply method, comprising:
by using a first-stage power converter, converting a supply voltage into a first output voltage, wherein the first-stage power converter comprises:
- an input capacitor, coupled between the supply voltage and a ground;
- a first switch, providing the supply voltage to a first node according to a first control signal and the modulation signal;
- a first resonant capacitor, coupled to the first node;
- a first resonant inductor, coupled between the first resonant capacitor and a second node;
- a second switch, coupling the second node to the first output voltage according to the first control signal and the modulation signal;
- a third switch, coupling the second node to the ground according to a second control signal and the modulation signal;
- a fourth switch, coupling the first node to a third node according to the first control signal, the second control signal, and the modulation signal;
- a first fly capacitor, coupled between the third node and a fourth node;
- a fifth switch, coupling the fourth node to the first output voltage according to the first control signal, the second control signal, and the modulation signal, wherein the fifth switch couples the fourth node to the first output voltage based on the state of the first control signal when the modulation signal is in a second logic level, and wherein the fifth switch couples the fourth node to the first output voltage based on the state of the second control signal when the modulation signal is in a first logic level; a sixth switch, coupling the fourth node to the ground according to the first control signal, the second control signal, and the modulation signal, wherein the sixth switch couples the fourth node to the ground based on the state of the second control signal when the modulation signal is in the second logic level, and wherein the sixth switch couples the fourth node to the ground based on the state of the first control signal when the modulation signal is in the first logic level; a seventh switch, coupling the third node to a fifth node according to the first control signal and the modulation signal; a second resonant capacitor, coupled to the fifth node; a second resonant inductor, coupled between the second resonant capacitor and a sixth node;
- an eighth switch, coupling the sixth node to the first output voltage according to the first control signal;
- a ninth switch, coupling the sixth node to the ground according to the second control signal;
- a tenth switch, coupling the fifth node to a seventh node according to the second control signal, wherein the seventh node is coupled to the first output voltage; and
- an output capacitor, coupled between the first output voltage and the ground, wherein the first control signal and the second control signal are out-of-phase;
converting the first output voltage into a second output voltage;
detecting output power of the second output voltage;
determining whether the output power of the second output voltage exceeds a threshold; and
modulating the first output voltage in response to the output power exceeding the threshold.

18. The power supply method of claim 17, wherein the step of modulating the first output voltage in response to the output power exceeding the threshold comprises:
increasing the first output voltage in response to the output power exceeding the threshold.

19. The power supply method of claim 18, wherein the step of modulating the first output voltage in response to the output power exceeding the threshold comprises:
decreasing the first output voltage in response to the output power not exceeding the threshold.

* * * * *